(12) United States Patent
Zhang et al.

(10) Patent No.: US 7,792,930 B1
(45) Date of Patent: Sep. 7, 2010

(54) NETWORK DEVICE CONFIGURATION USING SEPARATE LOGIC AND VERSION-BASED CONFIGURATION FILES

(75) Inventors: David Lei Zhang, San Jose, CA (US); Brian Yean-Shiang Leu, San Jose, CA (US); Chi-Chang Lin, San Jose, CA (US); Xiangang Huang, Campbell, CA (US); James E. Fehrle, Menlo Park, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1118 days.

(21) Appl. No.: 10/985,016

(22) Filed: Nov. 10, 2004

(51) Int. Cl.
*G06F 15/177* (2006.01)

(52) U.S. Cl. ...................... 709/220; 709/223

(58) Field of Classification Search ............... 709/220, 709/223
See application file for complete search history.

(56) References Cited

U.S. PATENT DOCUMENTS

| | | | | | |
|---|---|---|---|---|---|
| 5,806,078 | A  * | 9/1998  | Hug et al. | ............. | 715/205 |
| 6,003,039 | A  * | 12/1999 | Barry et al. | ............ | 707/103 R |
| 6,742,025 | B2 * | 5/2004  | Jennery et al. | ............ | 709/220 |
| 6,799,205 | B2 * | 9/2004  | Ludtke | ............ | 709/220 |
| 6,915,340 | B2 * | 7/2005  | Tanaka | ............ | 709/220 |
| 6,973,518 | B2 * | 12/2005 | Purpura | ............ | 710/104 |
| 6,978,301 | B2 * | 12/2005 | Tindal | ............ | 709/223 |
| 7,003,562 | B2 * | 2/2006  | Mayer | ............ | 709/223 |
| 7,051,088 | B2 * | 5/2006  | Sesek | ............ | 709/220 |
| 7,054,924 | B1 * | 5/2006  | Harvey et al. | ............ | 709/220 |
| 7,089,270 | B2 * | 8/2006  | Ren et al. | ............ | 707/203 |
| 7,203,708 | B2 * | 4/2007  | Liu et al. | ............ | 707/200 |
| 7,246,162 | B2 * | 7/2007  | Tindal | ............ | 709/223 |
| 7,246,163 | B2 * | 7/2007  | Tindal | ............ | 709/223 |
| 7,320,127 | B2 * | 1/2008  | Banks et al. | ............ | 717/168 |
| 7,353,262 | B2 * | 4/2008  | Styles et al. | ............ | 709/221 |
| 7,457,817 | B2 * | 11/2008 | Krishnaswamy et al. | .... | 707/102 |
| 2002/0032758 | A1 * | 3/2002 | Yen et al. | ............ | 709/220 |
| 2002/0169864 | A1 * | 11/2002 | Sesek | ............ | 709/223 |
| 2003/0088594 | A1 * | 5/2003 | Hamadi | ............ | 707/205 |
| 2003/0097427 | A1 * | 5/2003 | Parry | ............ | 709/220 |
| 2004/0064803 | A1 * | 4/2004 | Graves et al. | ............ | 717/104 |
| 2006/0047784 | A1 * | 3/2006 | Li et al. | ............ | 709/220 |
| 2006/0126530 | A1 * | 6/2006 | Fuhrmann et al. | ............ | 370/252 |

\* cited by examiner

*Primary Examiner*—Hassan Phillips
*Assistant Examiner*—Anthony Mejia
(74) *Attorney, Agent, or Firm*—Harrity & Harrity, LLP (57) ABSTRACT

A set of network devices having varying device attributes, such as varying attributes due to different operating system versions, different hardware versions, or different hardware platforms, may be efficiently managed. A syntax file may be used to describe constraints relating to attributes of multiple versions of the network devices. At least one device configuration file (DCF) stores version-based differences relating to the different versions of the network devices, the syntax file and at least one the one DCF collectively describe a set of constraints for the attributes of the network devices.

31 Claims, 7 Drawing Sheets

NETWORK DEVICE CONFIGURATION USING SEPARATE LOGIC AND VERSION-BASED CONFIGURATION FILES

FIELD OF THE INVENTION

Principles of the invention relate generally to network device management and, more particularly, to configuring network devices.

DESCRIPTION OF RELATED ART

In an increasingly networked world, devices that enable the network are becoming pervasive. Two examples of such network devices are firewalls and routers. A firewall may generally be defined as a network gateway device that protects the resources of a private network from users associated with other networks. An enterprise with an intranet that allows its workers access to the Internet may install a firewall to prevent outsiders from accessing its own private data resources and for controlling what outside resources its own users can access. A router may generally be defined as a network device that determines the next network point to which network packets should be forwarded as the packets progress towards their final destination.

Some entities, such as large corporations, may manage hundreds or thousands of network devices. The devices may occasionally need to be reconfigured to implement different network management policies, network interfaces, or to update or change other device features. One known technique for configuring such devices is through a command line interface (CLI). In a CLI, a network administrator may logon to a device and enter commands that are interpreted by the operating system of the device. For devices that require a large number of commands to be configured, the commands may be generated as a file and simply loaded into the particular devices to which they apply.

One problem with configuring multiple devices is keeping track of the agreed upon data format for configuring and managing the device. This problem can be particularly acute when the devices include differing hardware platforms or operating systems. A version incompatibility that causes even a minor difference between the correct command CLI and the actual command CLI can cause the device configuration procedure to fail.

Accordingly, it would be desirable to simplify the management of systems of multiple network devices.

SUMMARY OF THE INVENTION

One aspect of the invention is directed to a method for validating configuration data for a first network device. The method includes locating a first file that describes constraints relating to attributes of multiple versions of network devices, locating a second set of files that store version-based differences relating to the different versions of the network devices, and processing the first file and the second set of files to obtain a set of constraints for the attributes of the first network device. The method further includes using the set of constraints for the attributes of the first network device to validate configuration data for the first network device.

Another aspect of the invention is directed to a management server including a processor and a computer memory operatively coupled to the processor. The computer memory includes programming instructions configured to cause the processor to receive configuration data for a first network device. The computer memory further includes programming instructions configured to generate constraints relating to attributes of the first network device based on a syntax file that includes constraints relating to attributes of a plurality of network devices and at least one device capability file that includes version-based differences between different versions of the network devices. Still further, the computer memory includes programming instructions configured to validate the received configuration data for the first network device based on the generated constraints relating to the attributes of the first network device.

Yet another aspect of the invention is directed to a system including a number of network devices, where each of the network devices is associated with configuration data. The system further includes a management server configured to receive the configuration data for at least one of the network devices, obtain a set of constraints for attributes of the at least one of the network devices based on a first file that describes constraints relating to attributes of multiple versions of network devices and one or more second files that store version-based differences relating to the different versions of the network devices, and validate the configuration data for the at least one of the network devices based on the set of constraints.

Yet another aspect consistent with the invention is directed to a memory for storing data for access by an application program being executed on a computing device. The memory includes a first file for describing constraints relating to attributes of multiple versions of network devices and at least one second file for storing version-based differences relating to the different versions of the network devices. The first and the at least one second file collectively describe a complete set of constraints for the attributes of the network devices.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, device configuration files are split into separate logic and version-based files. The separation of these files allows for more efficient and easier configuration file maintenance.

Exemplary System Overview

Figure 1:
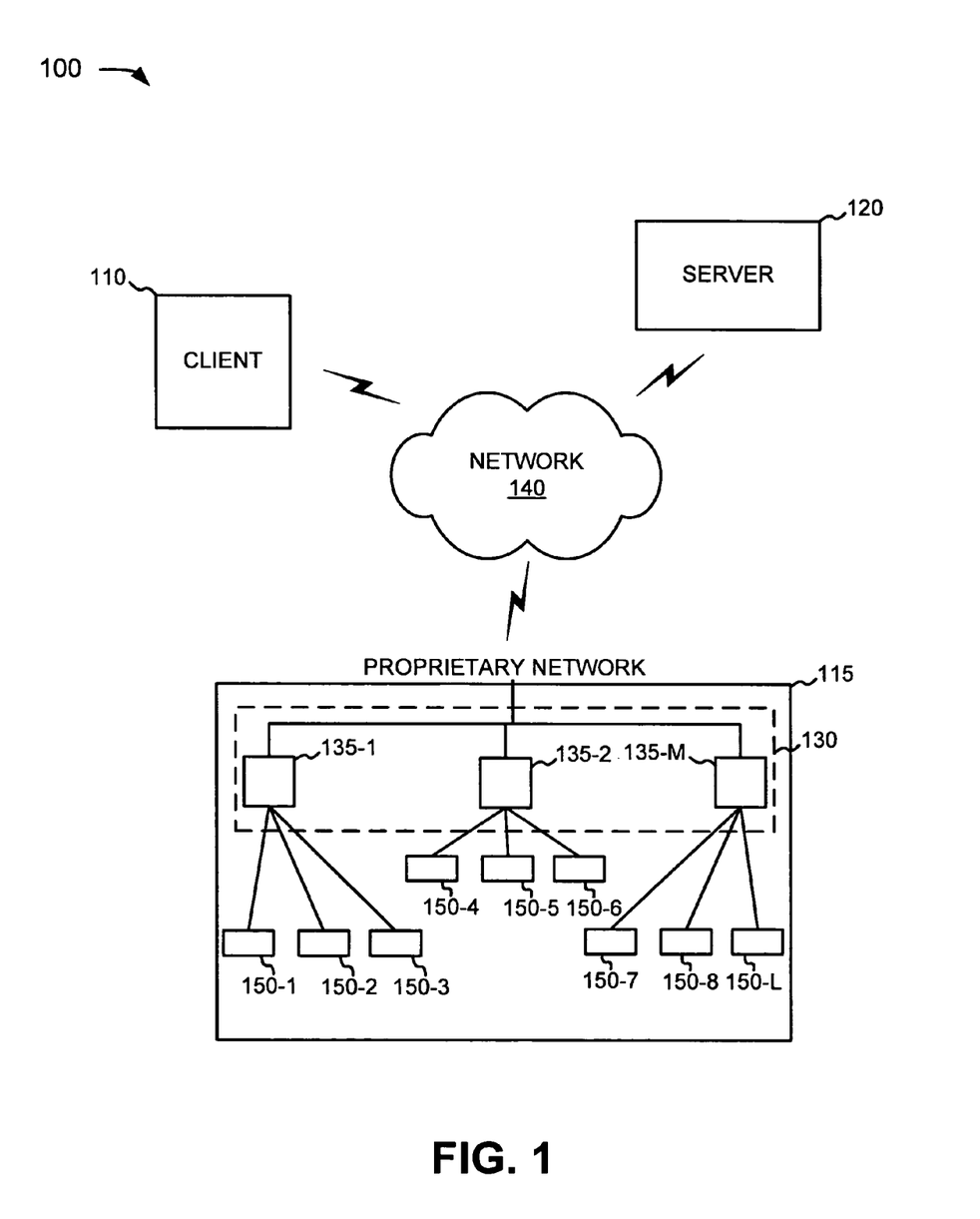
FIG. 1 is an exemplary diagram of a system in which concepts consistent with the principles of the invention may be implemented.

FIG. 1 is an exemplary diagram of a system 100 in which concepts consistent with the principles of the invention may be implemented. System 100 may include multiple entities, such as client computer 110, proprietary network 115 (e.g., a corporate network), and server device 120. Client 110, proprietary network 115, and server 120 may connect to one another via a network 140. Network 140 may include a local area network (LAN), a wide area network (WAN), a telephone network, such as the Public Switched Telephone Network (PSTN), an intranet, the Internet, or a combination of networks. A single client 110, proprietary network 115, and server 120 have been illustrated as connected to network 140 for simplicity. In practice, there may be more clients, servers, and proprietary networks.

Proprietary network 115 may be, for example, a corporate network that connects clients 150 to network 140 via a gateway 130. A gateway can generally be thought of as a network point that acts as an entrance to another network. Gateway 130 may include a number of network devices, such as firewall devices 135-1 through 135-N (collectively "firewall devices 135"). Clients 150-1 through 150-L (collectively "clients 150") of proprietary network 115 may connect to network 140 through firewall devices 135 of gateway 130.

Clients 110 and 150 may each include one or more devices such as a wireless telephone, a personal computer, a personal digital assistant (PDA), a lap top, or another type of computation or communication device, a thread or process running these devices, and/or an object executable by these devices. Server 120 may include a server device that processes, searches, and/or maintains information and provides such information to client 110 and clients 150.

Exemplary Network Device Architecture

Figure 2:
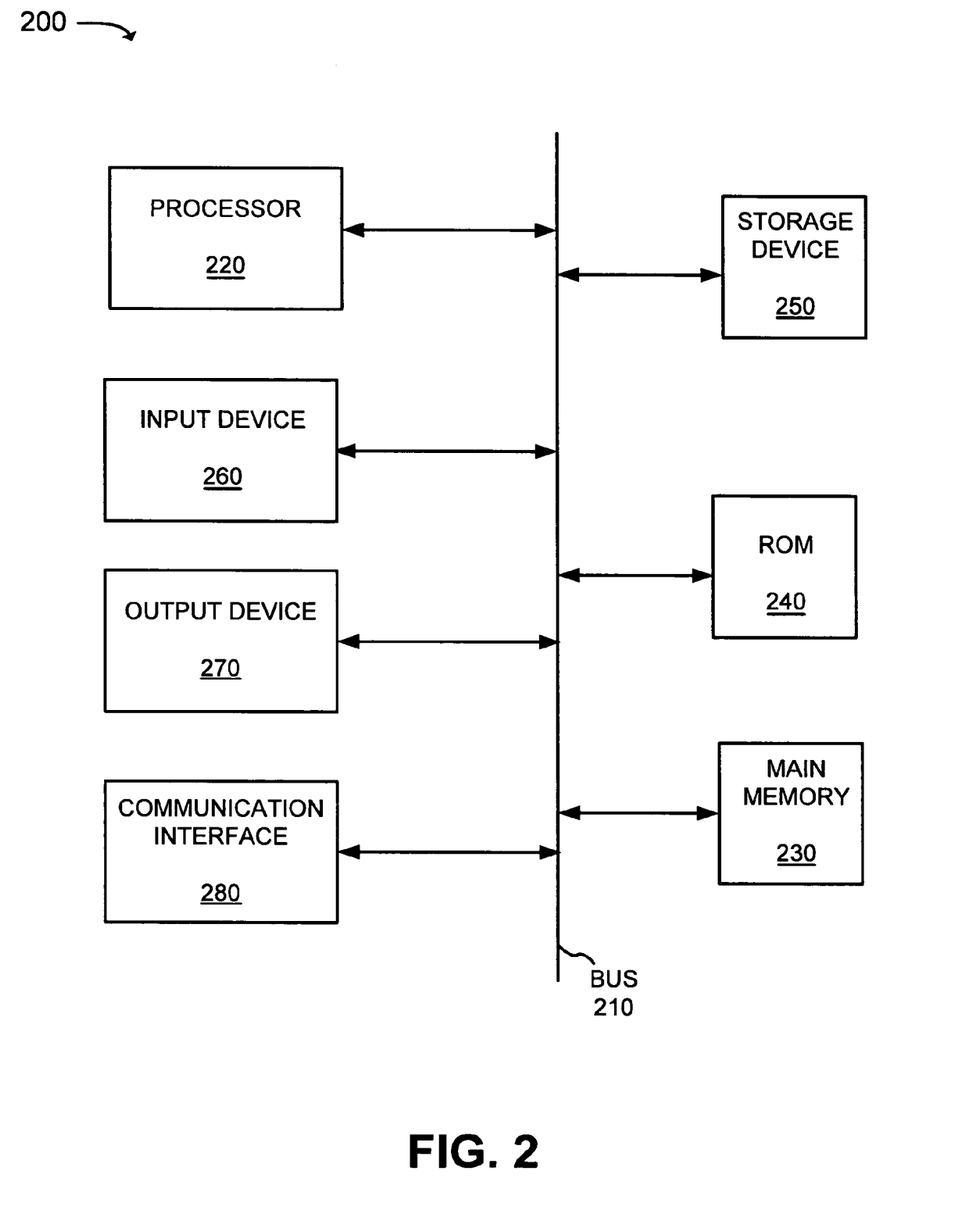
FIG. 2 is an exemplary diagram of a client, server, or other network device, such as a firewall or a router.

FIG. 2 is an exemplary diagram of a client, such as clients 110 and 150, server 120, or other network device, such as a firewall 135, illustrated as computing device 200. Computing device 200 may include a bus 210, a processor 220, a main memory 230, a read only memory (ROM) 240, a storage device 250, an input device 260, an output device 270, and a communication interface 280. Bus 210 may include conductors that permit communication among the components of computing device 200.

Processor 220 may include conventional processors, microprocessors, or processing logic that interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include one or more conventional mechanisms that permit a user to input information to computing device 200, such as a keyboard, a mouse, a pen, voice recognition and/or biometric mechanisms, etc. Output device 270 may include one or more conventional mechanisms that output information to the user, including a display, a printer, a speaker, etc. Communication interface 280 may include one or more transceiver-like mechanisms that enable computing device 200 to communicate with other devices and/or systems. For example, communication interface 280 may include mechanisms for communicating with another device or system via a network, such as network 140.

Computing device 200 may implement a number of functions, described in more detail below, using software instructions read into memory 230 from another computer-readable medium, such as data storage device 250, or from another device via communication interface 280. The software instructions contained in memory 230 may cause processor 220 to perform processes that will be described later. Alternatively, hardwired circuitry or other logic may be used in place of, or in combination with, software instructions to implement processes consistent with the invention. Thus, implementations consistent with the principles of the invention are not limited to any specific combination of hardware circuitry and software.

Configuration of a Network Device

Network devices, such as network devices 135 or other network devices, may need to be initially configured or later reconfigured by network administrators. The network devices may accept configuration data via commands entered through a CLI or through another type of configuration interface. In order to make a configuration procedure efficient and practical for multiple network devices, the commands for the network devices may be input to the network devices using automated procedures that upload files that include multiple commands (e.g., hundreds or even thousands of commands) to the network devices. Consistent with aspects of the invention, the commands/configuration data may be based on a number of files structured such that version-based differences between the network devices can be efficiently taken into account.

Figure 3:
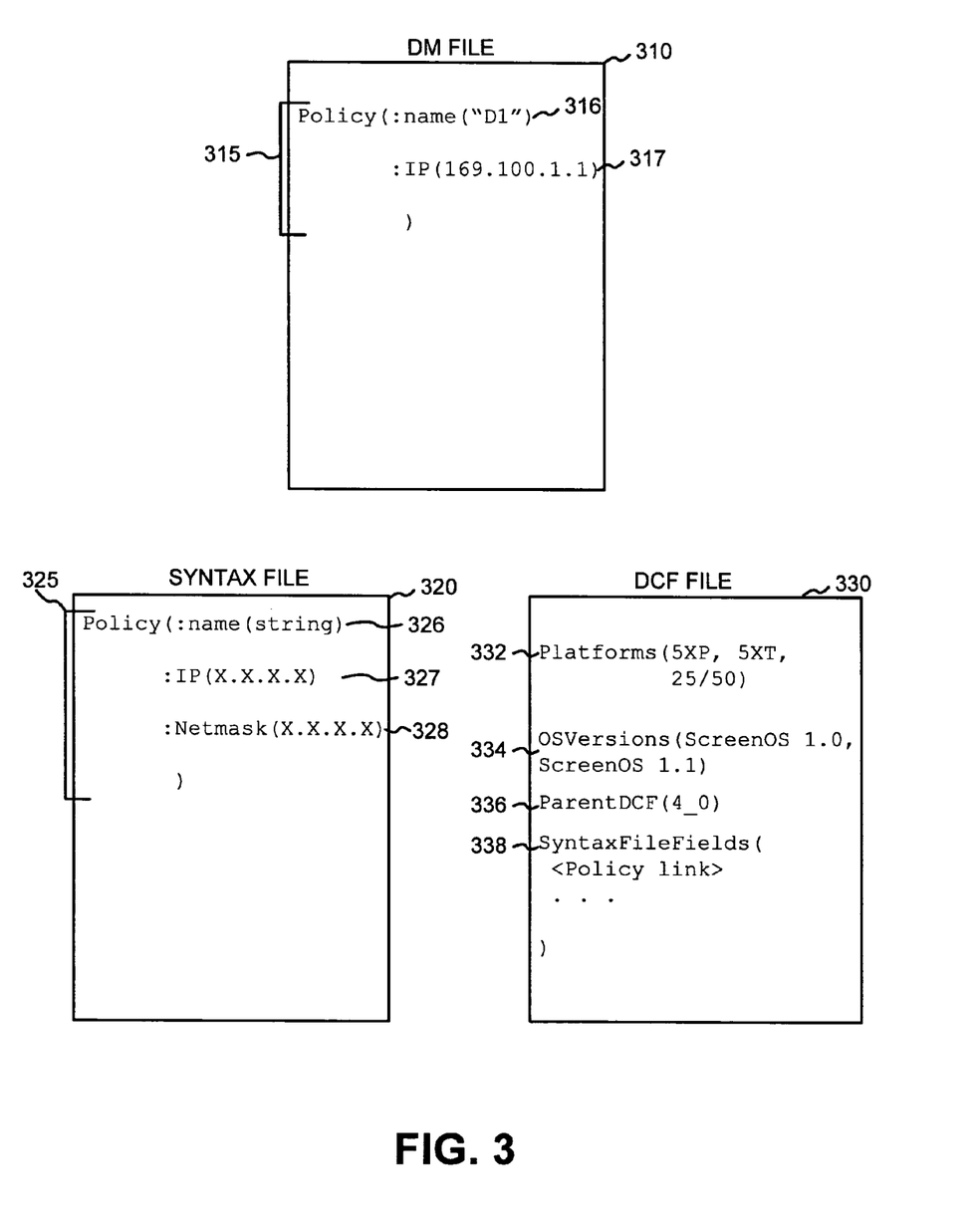
FIG. 3 is a diagram illustrating configuration files consistent with aspects of the invention.

FIG. 3 is a diagram illustrating configuration files consistent with aspects of the invention. The configuration files may include three files, which will be referred to herein as a data modeling (DM) file 310, a syntax file 320, and a device capability file (DCF) 330.

DM file 310 generally stores configuration data for a device. DM file 310 may be segmented manually by a network administrator or read from a device that is known to be operating as desired in the network. The configuration data may include data relating to features offered by the network device. For a firewall, for instance, DM file 310 may include data relating to network policy that is to be implemented by the firewall, interface functions of the firewall, or VPN (virtual private network) options allowed by the firewall. An example DM file entry 315 is shown in FIG. 3. Entry 315 may include policy configuration data that specifies, for example, a name entry 316 for the device and an IP address entry 317 for the device. One of ordinary skill in the art will recognize that DM file 310 may generally include any entries that describe configuration data of the network device.

Syntax file 320 may store constraints that apply to the configuration data for a particular set of network devices. In other words, syntax file 320 may describe the allowed network device attributes. The constraints of the network device may relate, for example, to the type and format of the information that can be in DM file 310. An example syntax entry 325 is shown in FIG. 3. Entry 325 may relate to device policy, and include a name field 326, an IP address field 327, and a netmask field 328. Policy entry 325 may thus specify that a "policy" entry include a name field that is a string, an IP address field that includes numbers in the format "X.X.X.X," and a netmask field that includes numbers in the format "X.X.X.X." When compared to policy entry 315 in DM file 310, syntax file 320 may indicate that policy entry 315 is improper as it does not include a "netmask" entry.

Consistent with an aspect of the invention, a single syntax file 320 may be created for multiple device platforms and versions of an operating system run by the platforms. For example, a family of firewall network devices may include a number of different firewall platforms, such as multiple different firewall devices of different capabilities. Further, within a single firewall model, different versions of the firewall may be released at different times. Syntax file 320 may store constraints for multiple device platforms, such as all firewall devices in a family of firewalls. The term "version-based differences" will be used herein to generally refer to differences between network devices due to different operating system versions, hardware/firmware differences, or combinations of hardware/firmware and operating system differences.

DCF file 330 may store information that encapsulates the version-based differences in a family of network devices. DCF files 330 may augment syntax file 320 by specifying how constraints in a syntax file change between different versions of the network devices. Syntax file 320, with the appropriate DCF file(s) 330, together may completely describe the constraints that are to be applied to DM file 310 for a particular device. In this manner, a single syntax file 320 can be used for a number of versions of a network device.

DCF file 330 may include a list of supported platforms (network devices) 332 and operating system (OS) versions 334 to which DCF file 330 applies. In this example, the supported platforms are the devices "5XP," "5XT," and "25/50." The supported OS versions are "ScreenOS version 1.0" and "ScreenOS version 1.1". DCF file 330 may additionally include a link 336 to the parent DCF file (described in more detail below) and links 338 to the fields in syntax file 320 that apply to the supported platforms/OS versions. Through links 338, DCF file 330 specifies the portions of syntax file 320 that are relevant to DCF file 330.

For any particular platform or family of network devices, different DCF files 330 may be created for each version of the network device. Each DCF file 330 may be created, for example, by the manufacturer of the network device and distributed with the network device. The information stored in the various DCF files may, as described in more detail below, be differentially stored.

Figure 4:
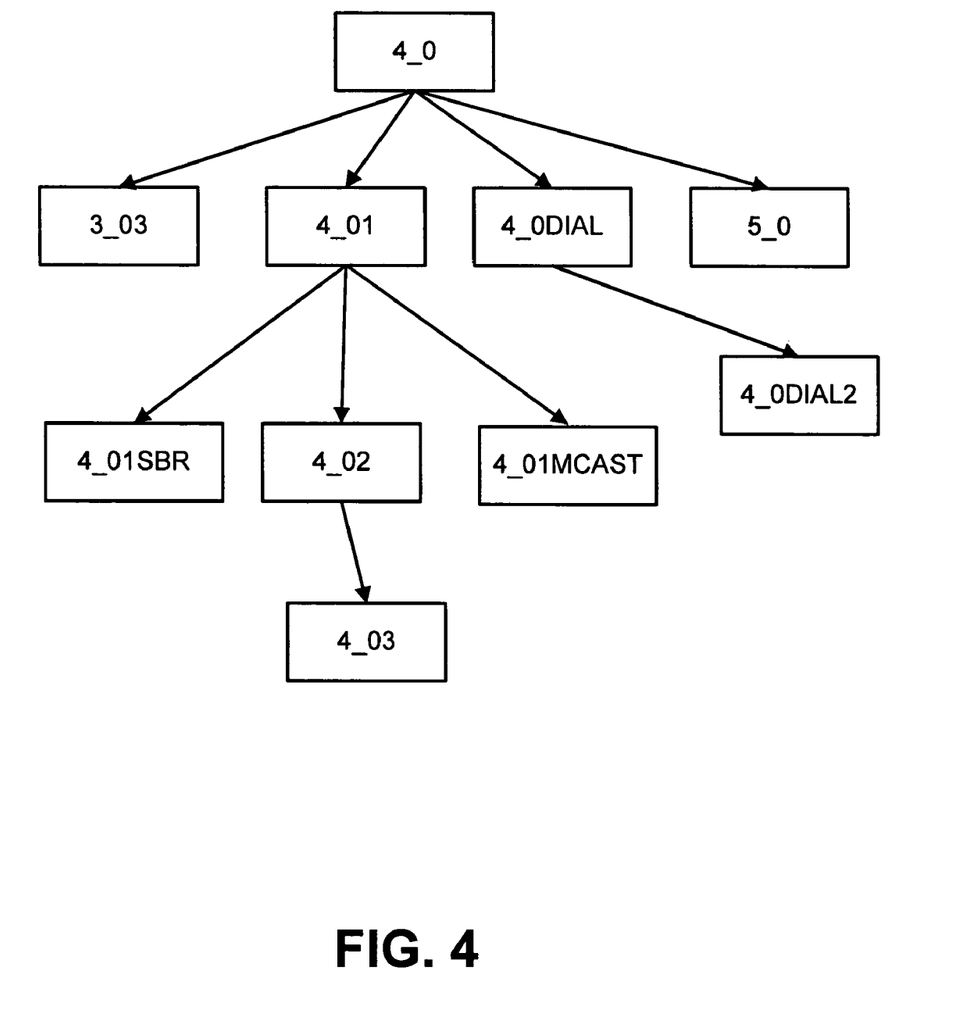
FIG. 4 is a diagram illustrating device capability files consistent with aspects of the invention.

FIG. 4 is a diagram illustrating the differential nature of the DCF files. The DCF file "4_0" may be the base DCF file that describes any version-based differences between the network devices covered by the DCF file 4_0, such as the "4_0" version of a network device, and syntax file 320. In this example, the DCF file 4_0 corresponds to four child DCF files, labeled as "3_03," "4_01," "4_0DIAL," and "5_0." Each of these four child DCF files may include the differences between the network device covered by the parent DCF file and the network device covered by the child file. For example, if the network devices that correspond to 4_0 DCF files are identical to the network devices that correspond to the 4_01 DCF file, except for the fact that the 4_01 DCF file devices can support a maximum of 64 IP addresses while the 4_0 devices can only support a maximum of 32 IP addresses, the DCF file 4_01 may include a single entry or link that indicates the maximum number of supported IP addresses is 64.

DCF files 330 can have multiple levels of dependency, creating a hierarchical arrangement of the DCF files. As shown in FIG. 4, the DCF files "4_01SBR," "4_02," "and "4_01MCAST" depend from the DCF file 4_01. Each of these three files describe the differences between the network devices covered by the 4_01 DCF file and the network devices covered by the respective child files. Similarly, DCF file "4_03" further depends from the DCF file "4_02" and describes the differences between the network devices covered by the 4_02 DCF file and the network devices covered by the child DCF file 4_03.

Exemplary Processing

Figure 5:
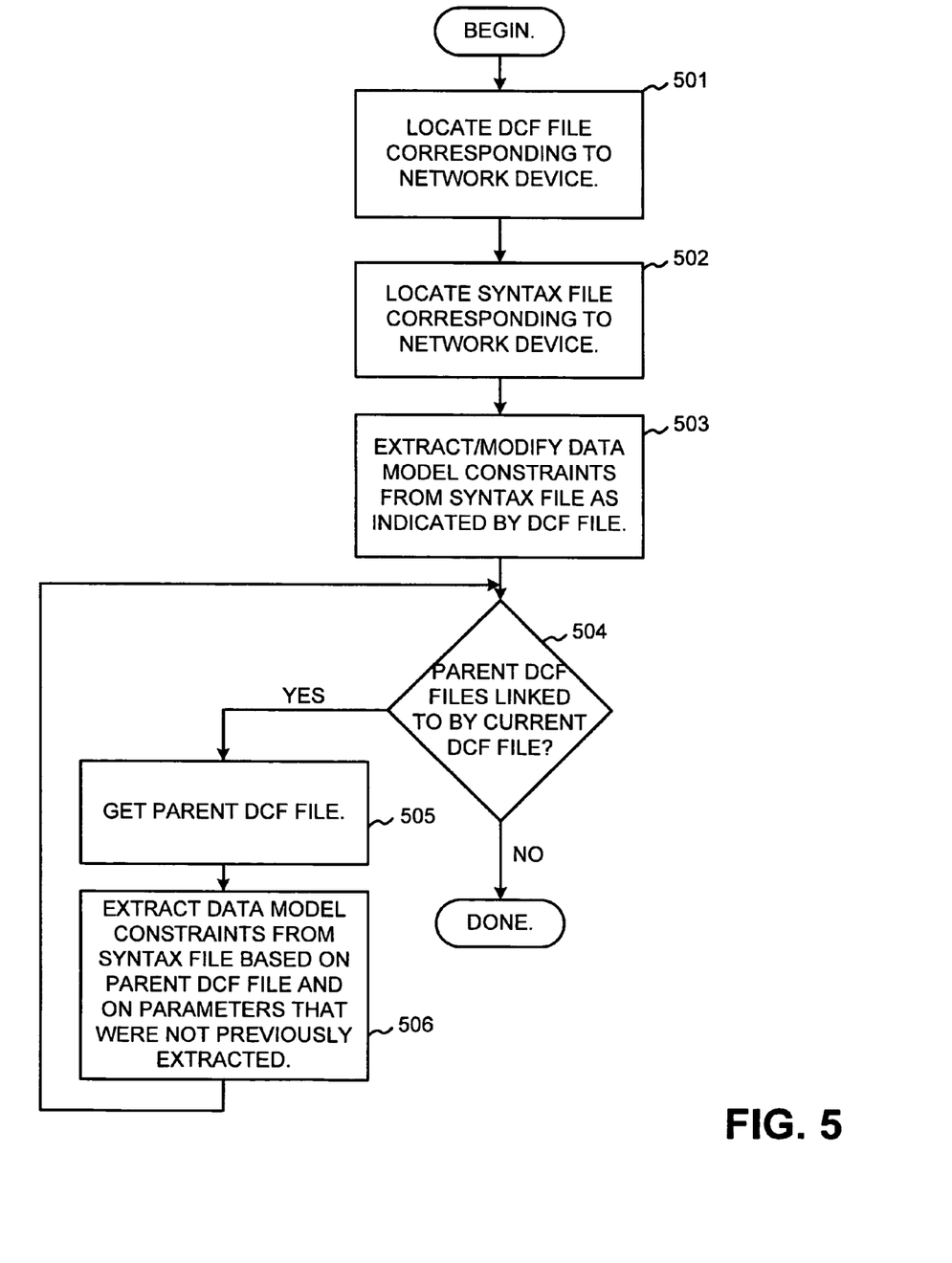
FIG. 5 is a flow chart illustrating exemplary processing of device capability files and a syntax file to obtain a model of the data configuration constraints for a particular device.

FIG. 5 is a flow chart illustrating exemplary processing of DCF files 330 and syntax file 320 to obtain a model of the data configuration constraints for a particular device. Processing may begin by locating or reading the DCF file that corresponds to the particular device for which the model is to be generated (act 501). The syntax file corresponding to this network device may also be located (act 502). As an example, assume that the network device is a particular version of a firewall device that corresponds to the DCF file 4_01 SBR. The syntax file that corresponds to this device may be a single syntax file for all the DCF file versions in the dependency tree (FIG. 4).

As previously mentioned, each DCF file may include information and/or links that describe what portions of the syntax file apply to that particular DCF file. This information/links may then be used to extract or modify the model for the data configuration constraints from the syntax file that apply to the network device (act 503). The DCF files may also contain links (e.g., link 336) to a parent DCF file. If there is such a link, the link may be used to obtain the parent DCF files (acts 504 and 505). If a parent DCF file was located in act 504, however, the constraints for the data that were not previously extracted from a child DCF file are extracted and added to the data model constraints for the device (act 506). If there are no parent file links, the last DCF file processed was the base DCF file, and the constraints extracted in acts 503 and 506 represent the set of constraints on the attributes of the device.

In the instant example, in which data configuration constraints are to be determined for a particular network device, DCF file 4_01SBR (the last DCF file that applied to that particular network device) would first be processed, followed by its parent DCF file 4_01, followed by the base DCF file 4_0. In this manner, the differential changes added by each DCF file are sequentially processed, using syntax file 320, to obtain the final set of data model constraints that apply to the network device. The final set of data model constraints may then be used to validate DM file 310 for the network device.

Although a single syntax file 320 was described above as applying to a set of network device platforms, in some implementations, a single syntax file and set of corresponding DCF files may be used for different feature sets of a network device. For example, a first syntax file may cover policy aspects of a device while a second syntax file covers interface aspects of the device.

Exemplary Implementation

Figure 6:
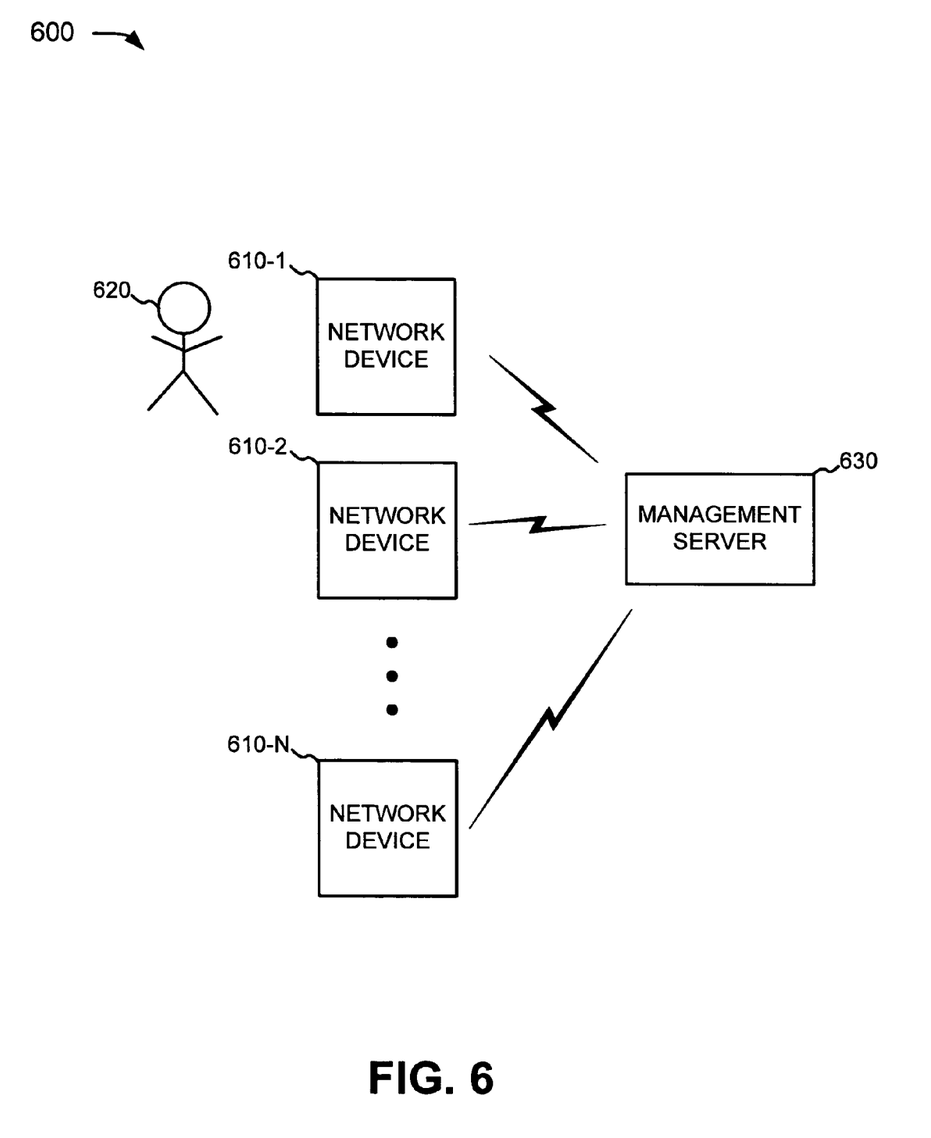
FIG. 6 is a diagram illustrating an exemplary system in which concepts consistent with aspects of the invention may be implemented.

FIG. 6 is a diagram illustrating an exemplary system in which concepts consistent with aspects of the invention may be implemented. In this example, a network 600, such as a local corporate network, includes a number of network devices 610-1 through 610-N (collectively "network devices 610"). Assume that a network administrator 620 has manually configured network device 610-1 to operate as desired. Network administrator 620 would now like to configure the remainder of network devices 610 to operate similarly.

Network 600 may include a management server 630 designed to provide management services to network devices 610. In particular, management server 630 may automatically configure network devices 610 based on a DM file.

Figure 7:
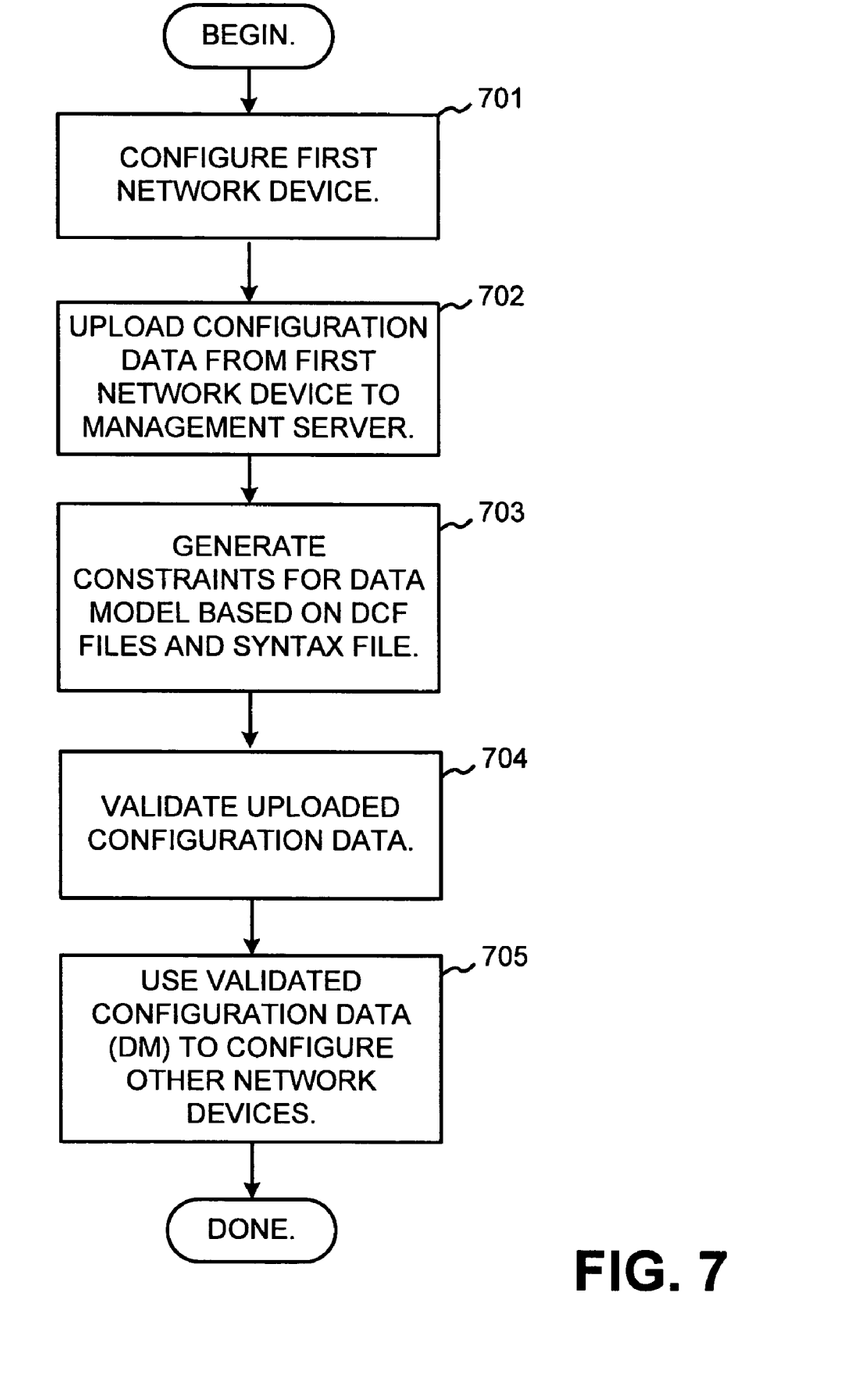
FIG. 7 is a flow chart illustrating exemplary operations for configuring network devices.

FIG. 7 is a flow chart illustrating exemplary operations for configuring network devices 610. After manually configuring one of devices 610 (e.g., device 610-1) to operate as desired (act 701), the network administrator 620 may upload the configuration data from device 610-1 to management server 630 (act 702). Management server 630 may generate the constraint data model for device 610-1 based on the appropriate syntax and DCF files, as previously described (act 703). Management server 630 may then validate the uploaded configuration data based on the generated constraints for the data model of the device (act 704). The validated configuration data for the device may be the DM file for the device, which may then be used to automatically configure the remainder of network devices 610 (act 705).

In another embodiment, a network administrator configures a network device model, which may be tested to determine that it has been configured properly. Management server 630 may upload the configuration for the network device model, generate the constraint model for the network device model, update the uploaded configuration data based on the generated constraints for the data model of the device, and configure network devices 610.

CONCLUSION

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the invention is not limiting of the invention. Thus, the operation and behavior of the aspects were described without reference to the specific software code or hardware design—it being understood that a person of ordinary skill in the art would be able to design software and control hardware to implement the aspects based on the description herein.

The foregoing description of embodiments consistent with the principles of the invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results.

No element, act, or instruction used in the present application should be construed as critical or essential to the invention unless explicitly described as such. Also, as used herein, the article "a" is intended to potentially allow for one or more items. Further, the phrase "based on" is intended to mean "based, at least in part, on" unless explicitly stated otherwise.

What is claimed is:

1. A method comprising:
    locating a first file that describes attributes allowed by multiple versions of network devices and constraints associated with each attribute;
    locating a second set of files that store version-based differences relating to the attributes allowed by the multiple versions of the network devices, where the second set of files further includes links to fields, in the first file, that correspond to the multiple versions of the network devices;
    extracting, using the links included in the second set of files, a set of constraints associated with the attributes of one or more of the network devices from the first file; and
    using the set of constraints for the attributes of the one or more of the network devices to validate configuration data for the one or more of the network devices.

2. The method of claim 1, where the second set of files stores the version-based differences as differential change information, between the multiple versions of the network devices, stored in a plurality of files in the second set of files.

3. The method of claim 2, where the second set of files is hierarchically arranged relative to one another.

4. The method of claim 1, where the configuration data of a particular network device is received from the particular network device.

5. The method of claim 1, further comprising:
    configuring another network device using the validated configuration data.

6. The method of claim 1, where the multiple versions of the network devices include different hardware versions of the network devices.

7. The method of claim 1, where the multiple versions of the network devices include different operating system versions of the network devices.

8. The method of claim 1, where the multiple versions of the network devices include different versions of firewalls.

9. The method of claim 1, where the first file describes constraints relating to attributes of a particular feature set of the one or more network devices.

10. A server comprising:
    a processor; and
    a computer memory operatively coupled to the processor, the computer memory including:
        programming instructions to cause the processor to receive configuration data for a particular network device,
        programming instructions to generate constraints relating to attributes of the particular network device based on a syntax file that includes constraints relating to attributes allowed by a plurality of network devices and at least one device capability file that includes version-based differences between different versions of the plurality of network devices, where the constraints are extracted from the syntax file using a link located in the at least one device capability file; and
        programming instructions to validate the received configuration data for the particular network device based on the generated constraints relating to the attributes of the particular network device.

11. The server of claim 10, the computer memory further comprising:
    programming instructions to use the validated configuration data to configure a plurality of additional network devices.

12. The server of claim 10, where the at least one device capability file stores the version-based differences as differential change information between the multiple versions of the network devices.

13. The server of claim 12, where multiple ones of the device capability files are hierarchically arranged relative to one another.

14. The server of claim 10, where the configuration data of the particular network device is obtained from the particular network device.

15. The server of claim 10, where the different versions of the network devices include different hardware versions of the network devices.

16. The server of claim 10, where the different versions of the network devices include different operating system versions of the network devices.

17. The server of claim 10, where the different versions of the network devices include different versions of firewalls.

18. The server of claim 10, where the plurality of network devices include network devices having different versions, platforms, or operating systems.

19. The server of claim 10, where the syntax file includes constraints relating to attributes of a particular feature set of the plurality of network devices.

20. A system comprising:
   a plurality of network devices, each of the network devices being associated with configuration data; and
   a management server to receive the configuration data for at least one of the plurality of network devices, obtain a set of constraints, for attributes of the at least one of the plurality of network devices, based on a first file that describes constraints relating to attributes allowed by multiple versions of network devices and based on one or more second files that store version-based differences relating to the different versions of the network devices, where the one or more second files further store links that are used to obtain the set of constraints from the first file, and validate the configuration data for the at least one of the plurality of network devices based on the set of constraints obtained using the stored links.

21. The system of claim 20, where the management server is further to transmit configuration data to additional ones of the plurality of network devices.

22. The system of claim 20, where the plurality of network devices include firewalls.

23. The system of claim 20, where the one or more second files store the version-based differences as differential change information between different ones of the second files.

24. The system of claim 23, where the second set of files is hierarchically arranged relative to one another.

25. A device comprising:
   means for locating a first file that describes attributes allowed by multiple versions of network devices and constraints associated with each attribute;
   means for locating a second set of files that store version-based differences relating to the attributes allowed by the multiple versions of the network devices, where the second set of files further include links to fields, in the first file, that correspond to the multiple versions of the network devices;
   means for extracting, a set of constraints associated with the attributes of one or more of the network devices from the first file, using the links included in the second set of files; and
   means for validating configuration data for a particular network device against the set of constraints for the attributes of the particular network device.

26. A memory for storing data for access by an application program being executed on a computing device, the memory comprising:
   a first file to describe constraints relating to attributes allowed by multiple versions of network devices; and
   at least one second file to store version-based differences relating to the different versions of the network devices, where the at least one second file stores links to fields in the first file that apply to a particular network device, where the links are used to extract the constraints from the first file, and where the first file and the at least one second file collectively describing a set of constraints for the attributes of the network devices.

27. The memory of claim 26, where the at least one second file stores the version-based differences as differential change information between various ones of the second files.

28. The memory of claim 27, where the at least one second file includes a plurality of second files that are hierarchically arranged.

29. The method of claim 1, where the constraints include a syntax of the attributes.

30. The method of claim 29, where the syntax includes a type and a format of the attributes.

31. The server of claim 10, where the syntax file defines a type and a format of the attributes.

\* \* \* \* \*